United States Patent [19]
Wakatsuki et al.

[11] Patent Number: 5,278,551
[45] Date of Patent: Jan. 11, 1994

[54] METER READING SYSTEM

[75] Inventors: Yoshio Wakatsuki; Toshiharu Okuyama; Hajime Takeuchi; Giichiro Shimizu; Misao Shimizu, all of Tokyo, Japan

[73] Assignee: Nitto Kohki Co., Ltd., Tokyo, Japan

[21] Appl. No.: 42,919

[22] Filed: Apr. 6, 1993

Related U.S. Application Data

[63] Continuation of Ser. No. 700,877, May 10, 1991, abandoned, which is a continuation of Ser. No. 492,099, Mar. 12, 1990, abandoned.

[30] Foreign Application Priority Data

Mar. 20, 1989 [JP] Japan .................... 1-68521

[51] Int. Cl.$^5$ .............................. G08B 23/00
[52] U.S. Cl. ...................... 340/870.02; 340/870.05
[58] Field of Search ... 235/380-382.5, 456, 462, 472; 364/464.04; 340/870.02, 870.05; 341/22; 368/41

[56] References Cited

U.S. PATENT DOCUMENTS

| | | | |
|---|---|---|---|
| 3,932,730 | 1/1976 | Ambrosio | 364/464.04 X |
| 4,133,034 | 1/1979 | Etter | 364/464.04 |
| 4,162,610 | 7/1979 | Levine | 368/41 |
| 4,180,204 | 12/1979 | Koenig et al. | 235/472 X |
| 4,387,296 | 6/1983 | Newell et al. | 364/464.04 X |
| 4,418,277 | 11/1983 | Tremmel et al. | 235/472 |
| 4,727,245 | 2/1988 | Dobbins et al. | 235/472 |
| 4,746,932 | 5/1988 | Sato | 235/472 X |
| 4,835,372 | 5/1989 | Gombrich et al. | 235/462 X |

FOREIGN PATENT DOCUMENTS

| | | |
|---|---|---|
| 3043557 | 4/1982 | Fed. Rep. of Germany . |
| 63-257836 | 9/1988 | Japan . |
| 1593385 | 7/1981 | United Kingdom . |
| 2070829 | 9/1981 | United Kingdom . |
| 2083932 | 9/1982 | United Kingdom . |

*Primary Examiner*—Ulysses Weldon
*Attorney, Agent, or Firm*—Nixon & Vanderhye

[57] ABSTRACT

A meter at each user's house has a bar-coded user number shown thereon, and has a display section for displaying a reading. A data input terminal unit has a bar code reader for reading the user number and a keyboard for manually inputting a present reading. A data recording controller has a meter reading data file having a present reading for each user number. The data input terminal unit radio-transmits a read user number to the data recording controller and radio-receives a previous reading, corresponding to the user number, from said data recording controller. The data input terminal unit computes the amount used from this previous reading and the present reading manually input, and causes a printer to print meter reading data including this used amount on a reading slip while radio-transmitting it to the data recording controller.

7 Claims, 11 Drawing Sheets

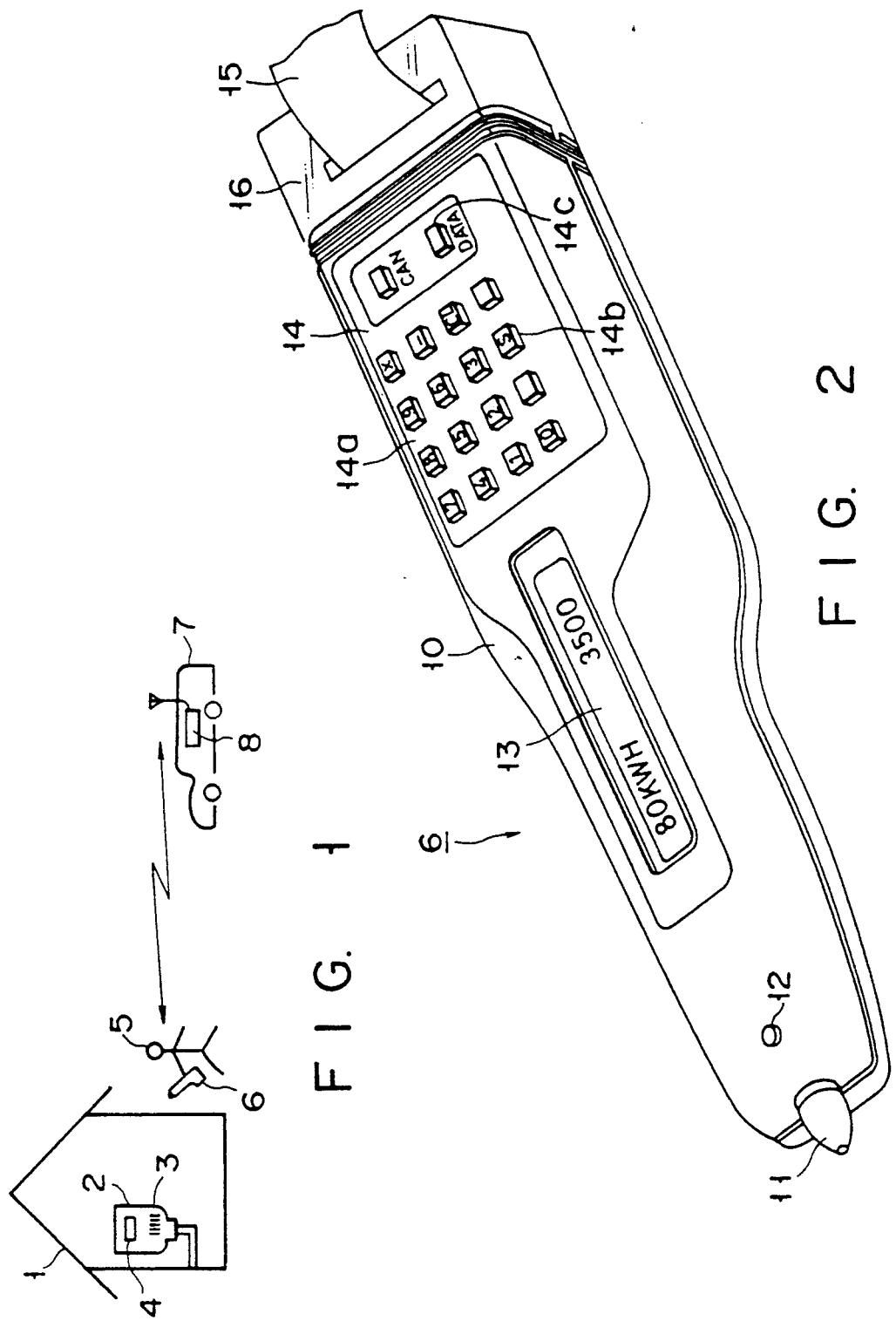

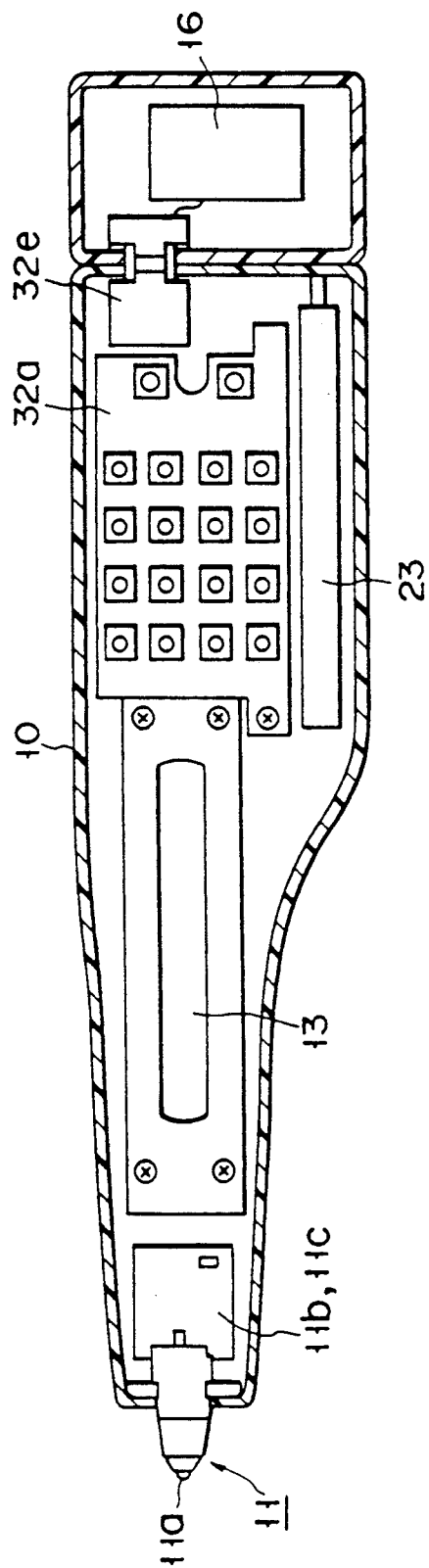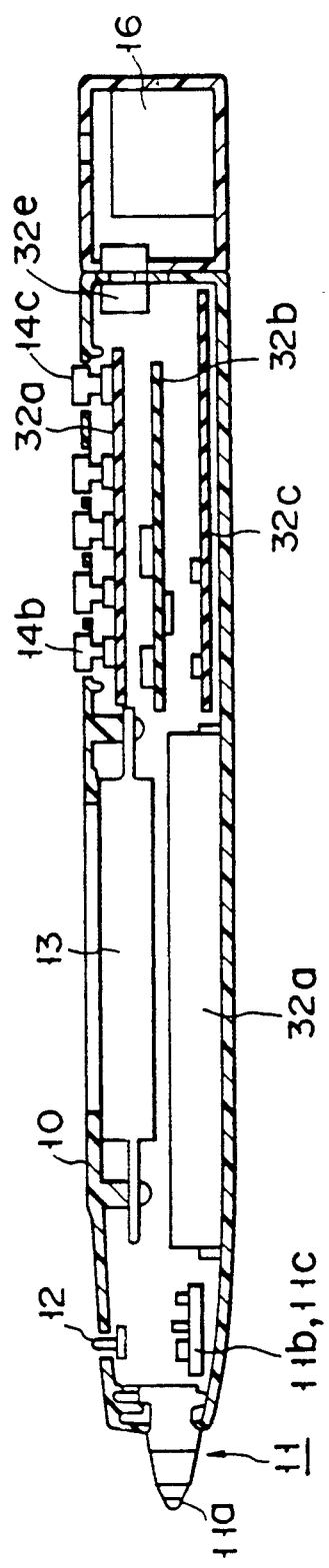
FIG. 3A
FIG. 3B

FIG. 7

| USER NUMBER | PREVIOUS READING | PRESENT READING | PRESENT AMOUNT USED | CHARGED RATE |
|---|---|---|---|---|
| AD1 | D0 | D1 | D2 | S |
| AD2 | --- | --- | --- | |
| | | | | |
| --- | | | | |

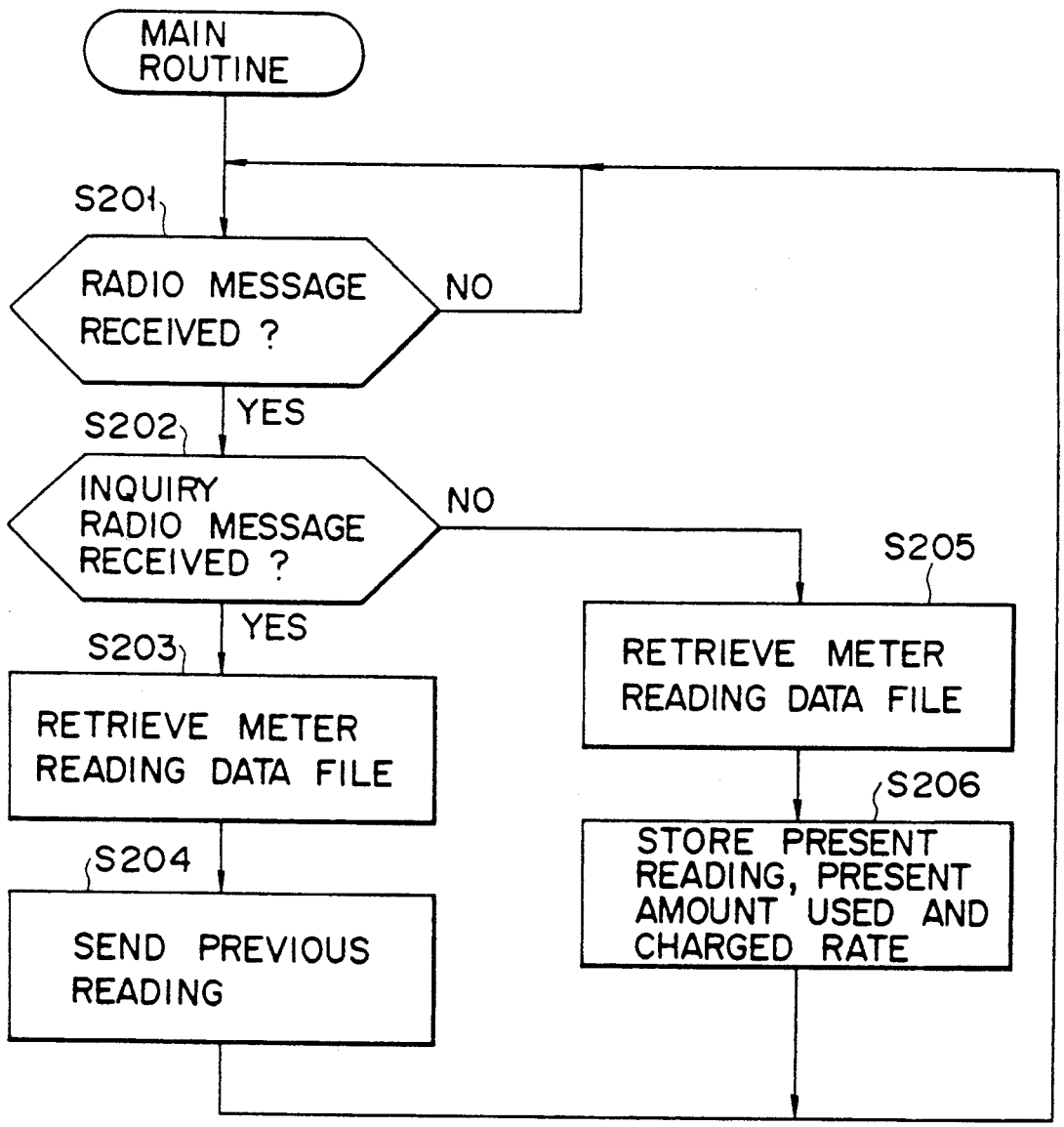
F I G. 9

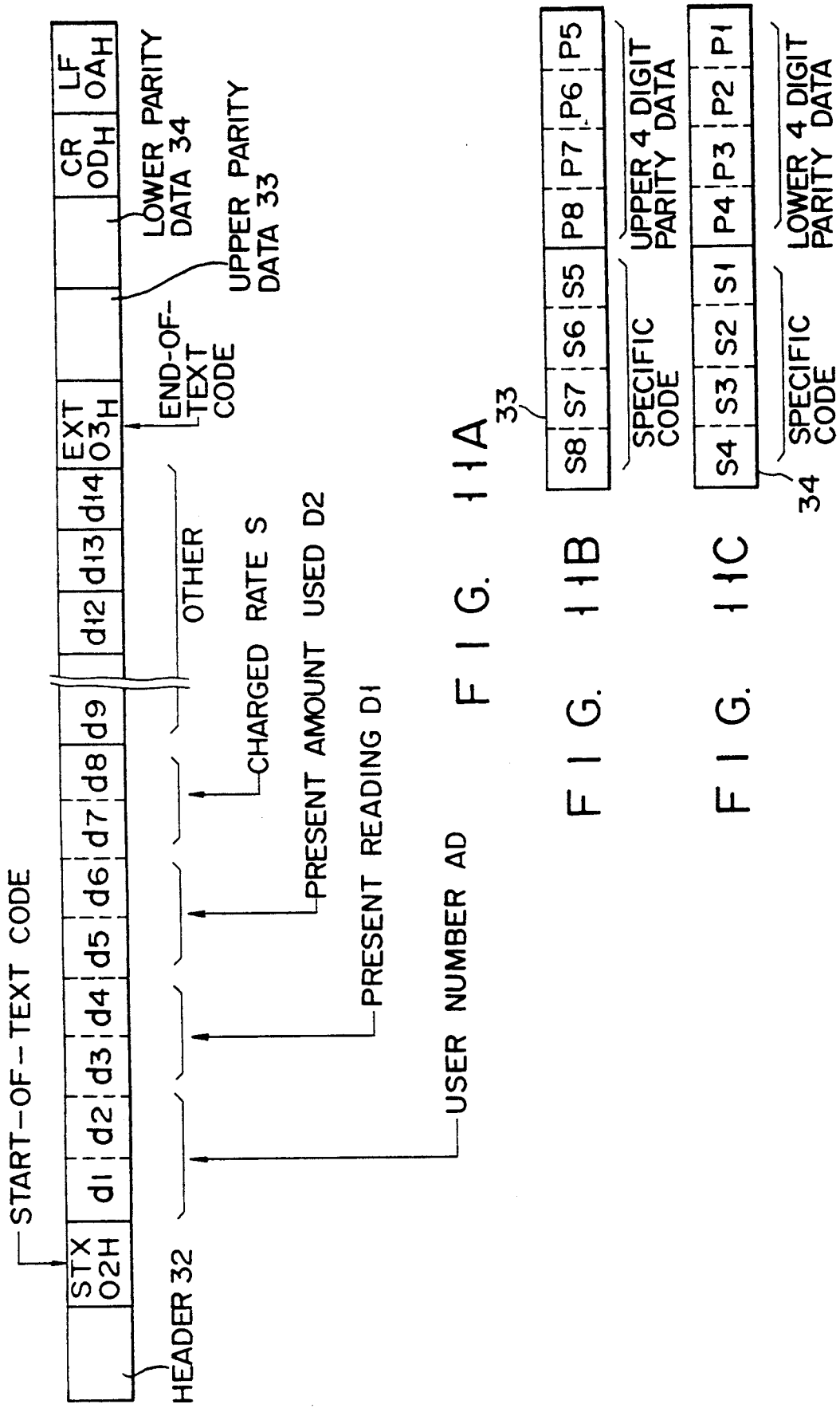

METER READING SYSTEM

This is a continuation of U.S. patent application Ser. No. 07/700,877, filed May 10, 1991, now abandoned, which is a continuation of U.S. patent application Ser. No. 492,099, filed Mar. 12, 1990, now abandoned.

BACKGROUND OF THE INVENTION

1. Field of the Invention

The present invention relates to a meter reading system for use in periodical reading of meters for power, gas, water, etc. placed at a house of each user.

2. Description of the Related Art

At present, in periodically reading a power meter, gas meter, water meter and the like placed at individual users' houses, such as homes and factories, a person who reads these meters (hereinafter simply referred to as meterman) generally goes round to individual users' houses door to door to obtain a present reading on a meter at each house with his own eyes. The meterman then records the reading on a note or multiple recording slips having a plurality of copyable sheets; a previous reading for each user is prerecorded on the multiple recording slips. The meterman subtracts the previous reading from the present one to obtain the present amount used and enters the value on the slips. The meterman then detaches one of the slips on which both the present reading and the present amount used are recorded, and leaves the slip at the user's house or hands it to the user. The slip is a reference for a rate which should be paid via a bank, a post office, or the like, or will be automatically deducted from a bank account.

The meterman brings the remaining slips also having the present reading recorded back to his office in a power company, gas company or the like. The meterman or another operator in this office enters the present reading in a host computer using a terminal such as a keyboard.

As is obvious from the above, it is necessary for a meterman to acquire a present reading on a meter placed at the house of each user, record it on a slip or note, then enter the recorded present reading in the host computer through a keyboard. That is, the same data is read twice by the same person or different persons at different places. This inevitably reduces the efficiency of the overall meter reading work.

As a solution to this shortcoming, there has been proposed a meter reading system according to which an output terminal for outputting a reading is mounted to each meter, and a meterman carries a data input terminal unit having an input terminal adapted to be coupled to the output terminal and connects the unit to the meter to automatically obtain a reading.

According to such a meter reading system, however, meters set at the houses of individual users should be modified, which requires a vast amount of investment in equipment and a great amount of labors in replacing the existing meters with the modified ones. Further, meter reading data as well as a user number to specify this data need be input to the aforementioned data input terminal unit, and the user number should be manually input through a keyboard by a meterman.

SUMMARY OF THE INVENTION

Accordingly, it is an object of this invention to provide a meter reading system which is so constituted that simply putting a bar-coded user number on a meter placed at each user's house and without modifying the meter can permit a bar code reader to read the user number and entering a reading acquired by a meterman using keys can automatically input the user number and reading into a host computer, whereby manual input of the user number and reading can be reduced as much as possible to reduce the load of the meterman and the reliability of the meter reading work can be improved.

According to this invention, there is provided a meter reading system comprising: a data recording controller having a meter reading data file having a area formed for storing a previous reading for each user number and capable of storing at least a present reading and a charged rate; and a data input terminal unit for inputting a present reading of a meter placed at each user and radio-transmitting the present reading to the data recording controller.

Particularly, the data input terminal unit comprises: a bar code reader for reading the bar-coded user number shown on the meter; a keyboard for manually entering a present reading according to a reading displayed on a display section of the meter; inquiry means for inquiring a previous reading associated with the user number read by the bar code reader to the data recording controller; used-amount computing means for computing an amount used from the previous reading given from the data recording controller in response to an inquiry from the inquiry means and the present reading entered through the keyboard; reading slip issuing means for printing, on a reading slip, meter reading data including at least the previous reading and the computed amount used; and meter reading data transmitting means for transmitting the meter reading data to the data recording controller.

According to the present meter reading system, a bar-coded user number is shown on a meter provided at each user. The data input terminal unit incorporates a bar code reader, keyboard and transmitter/receiver. Further, a meter reading data file in a data recording controller has previous readings stored therein for individual user numbers and has an area for storing meter reading data such as a present reading and an amount used.

A meterman uses the bar code reader of the data input terminal unit to read the user number on the meter, and visually acquires a present reading and enters it using keys. As a consequence, an inquiry for the previous reading associated with the user number is transmitted to the data recording controller. When the requested previous reading is returned, the amount used is automatically calculated from the previous reading and present reading, and meter reading data including the previous reading, present reading and the calculated amount is printed on a reading slip as well as is sent to the data recording controller. This controller stores the received meter reading data into a specific area in the meter reading data file associated with the user number.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic diagram illustrating the general structure of a meter reading according to one embodiment of this invention;

FIG. 2 is a perspective view of a data input terminal unit for use in the meter reading system according to this embodiment;

FIGS. 3A and 3B are respectively front and side cross sections illustrating the internal structure of the data input terminal unit shown in FIG. 2;

FIG. 7 is a diagram showing a meter reading data file stored in a floppy disk serving as an external storage of the data recording controller in FIG. 6;

FIG. 9 is a flowchart for explaining the operation of the data recording controller shown in FIG. 6;

FIG. 11A is a diagram showing the structure of a radio message for data transfer; and FIGS. 11B and 11C are diagrams illustrating the structures of upper parity data and lower parity data.

DETAILED DESCRIPTION OF THE PREFERRED EMBODIMENTS

Figure 4:
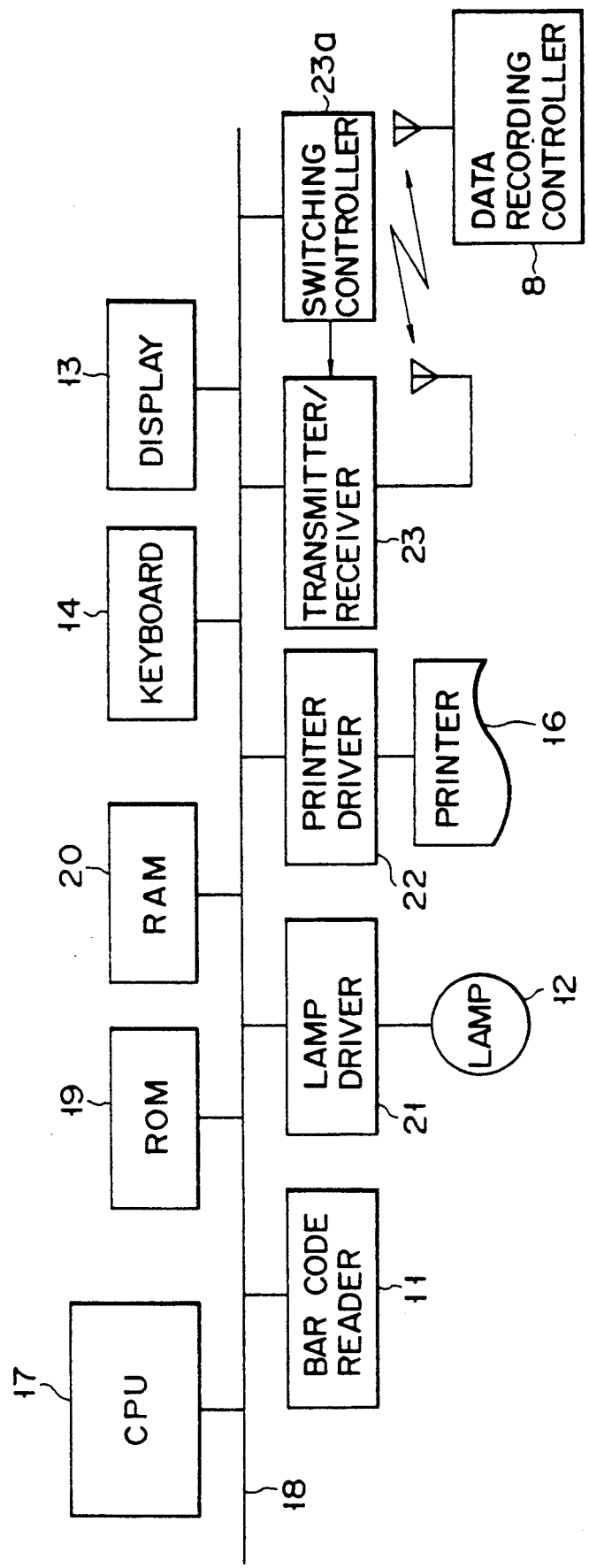
FIG. 4 is a block diagram showing the electric arrangement of the data input terminal unit shown in FIG. 2.

A preferred embodiment of this invention will now be described referring to the accompanying drawings.

FIG. 1 is a schematic diagram illustrating a meter reading system according to one embodiment. A label with a bar-coded user number 3 is attached to a power or gas meter 2 located at each user's house 1. The meter 2 has a digital display section 4 for providing a digital display of a current or present reading in a plurality of digits.

A meterman 5 going around to each user's house 1 has a data input terminal unit 6 of a handy size. This meterman 5 goes around the houses of the individual users one by one in an automobile 7 with a data recording controller 8 installed therein. This controller 8 and the data input terminal unit 6 ca exchange data through radio-transmission.

FIG. 2 is a perspective view of the data input terminal unit 6 carried by the meterman 5. At the tip of a case 10 of a size holdable by fingers, a pen scanner type bar code reader 11 is mounted to read a bar-coded user number 3. Further, along the length of the case 10 are arranged a lamp 12 which is lit when a bar code is properly read, a display 13 for displaying various information such as the read user number and a calculated amount used, a keyboard 14 for entering a present reading read by the meterman 5, and a printer 16 for issuing a reading slip 15.

The keyboard 14 includes a ten-key 14a for entering numerical data and various function keys such as a set key 14b for confirming registered numerical data and a data send key 14c for radio-transmitting meter reading data to the data recording controller 8.

The meterman 5 holding the data input terminal unit 6 in one hand as shown in FIG. 1 reads the user number 3 on the label attached to the meter 2 with the bar code reader at the tip of the unit 6. Then, the meterman 5 visually reads a reading displayed on the digital display section 4 of the meter 2, and operates keys on the keyboard 14 with the other hand to input the read reading as a present reading $D_1$.

FIGS. 3A and 3B are longitudinal front and side cross sections of the inside of the data input terminal unit 6. As illustrated, a binary circuit 11b and code converter 11c are provided adjacent to a photosensor 11a of the bar code reader 11, and the display 13 is provided at the center of the case 10. In addition, under the keyboard 14 is a keyboard board 32a having an array of switch elements which are open or closed according to the operation of the individual keys. Under the keyboard board 32a are installed two printed circuit (PC) boards 32b and 32c having electronic components such as a CPU mounted, and a transmitter/receiver 23. A battery 32a for supplying drive power to the individual electronic components is dispoved under the display 13. The printer 16 is connected via a connecting socket 32e to the PC boards 32b and 32c. That is, the printer portion can be detached from the case 10.

FIG. 4 is a block diagram illustrating the schematic structure of the data input terminal unit 6. A CPU 17 for executing various arithmetic operations is connected via a bus line 18 with various components: a ROM 19 for storing a program, a RAM 20 for storing various read data, the keyboard 14, the display 13, the bar code reader 11, a lamp driver 21 for driving the lamp 12, a printer driver 22 for driving the printer 16, the transmitter/receiver 23 for radio-transmitting various read data to the data recording controller 8 and receiving data such as a previous reading sent from the controller, and a switching controller 23a for switching between a reception mode and a transmission mode of the transmitter/receiver 23.

Figure 5:
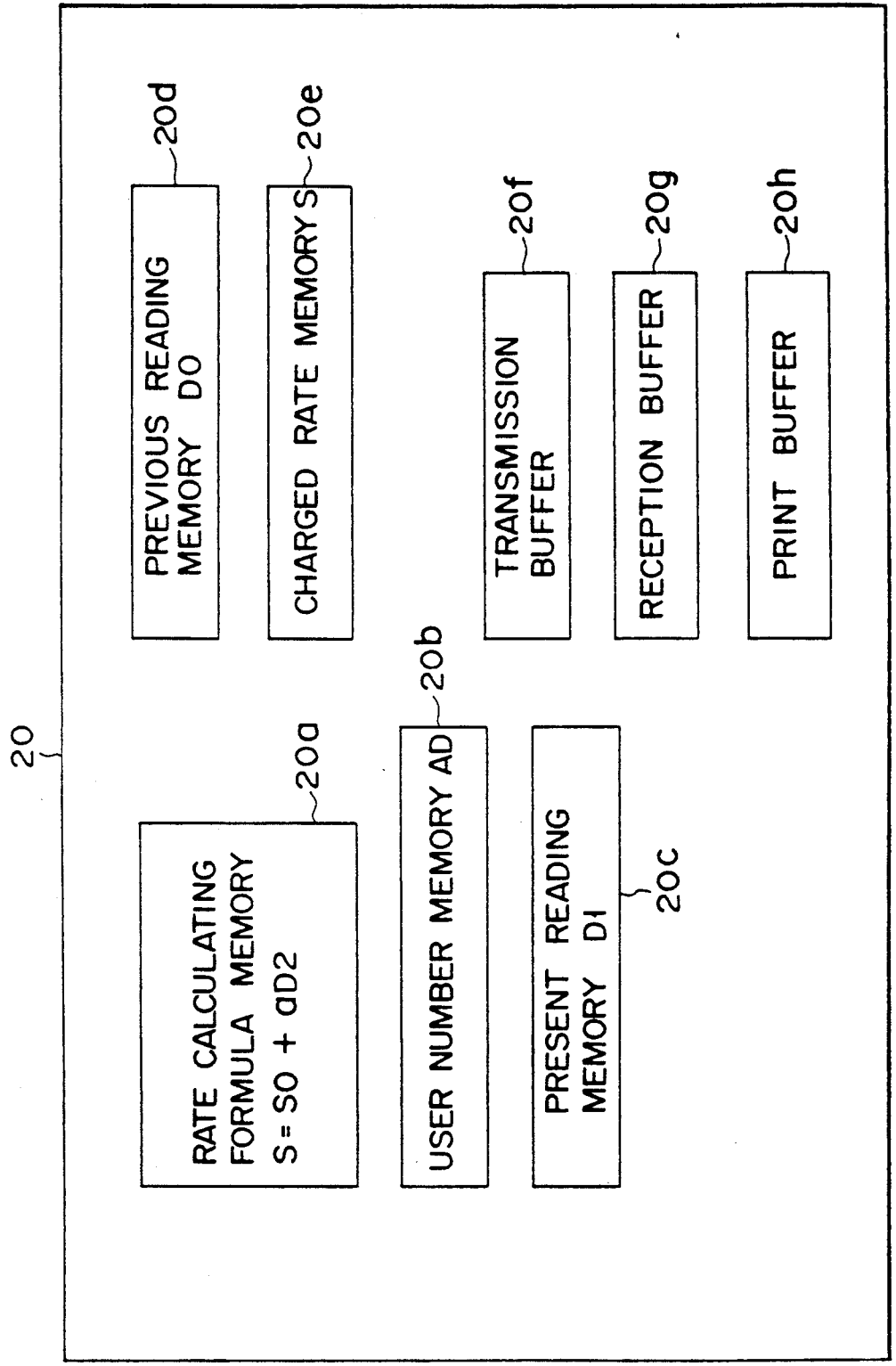
FIG. 5 is a diagram illustrating the contents of a RAM in FIG. 4.

As shown in FIG. 5, the RAM 20 has a rate calculating formula memory 20a formed for storing a rate calculating formula ($S=S_0aD_2$) for computing a present charged rate S from a present amount used $D_2$, which is calculated from a previous reading $D_0$ and a present reading $D_1$. $S_0$ in the formula is a base rate. The RAM 20 further has a user number memory 20b for temporary storage of a user number AD read by the bar code reader 11, a present reading memory 20c for temporary storage of the present reading $D_1$ entered using keys, a previous reading memory 20d for temporary storage of the previous reading $D_0$ sent from the data recording controller 8, a charged rate memory 20e for temporary storage of the computed present charged rate S, a transmission buffer 20f and a reception buffer 20g for data exchange with the data recording controller 8, and a print buffer 20h for temporary storage of print data to be printed on the reading slip 15.

Figure 6:
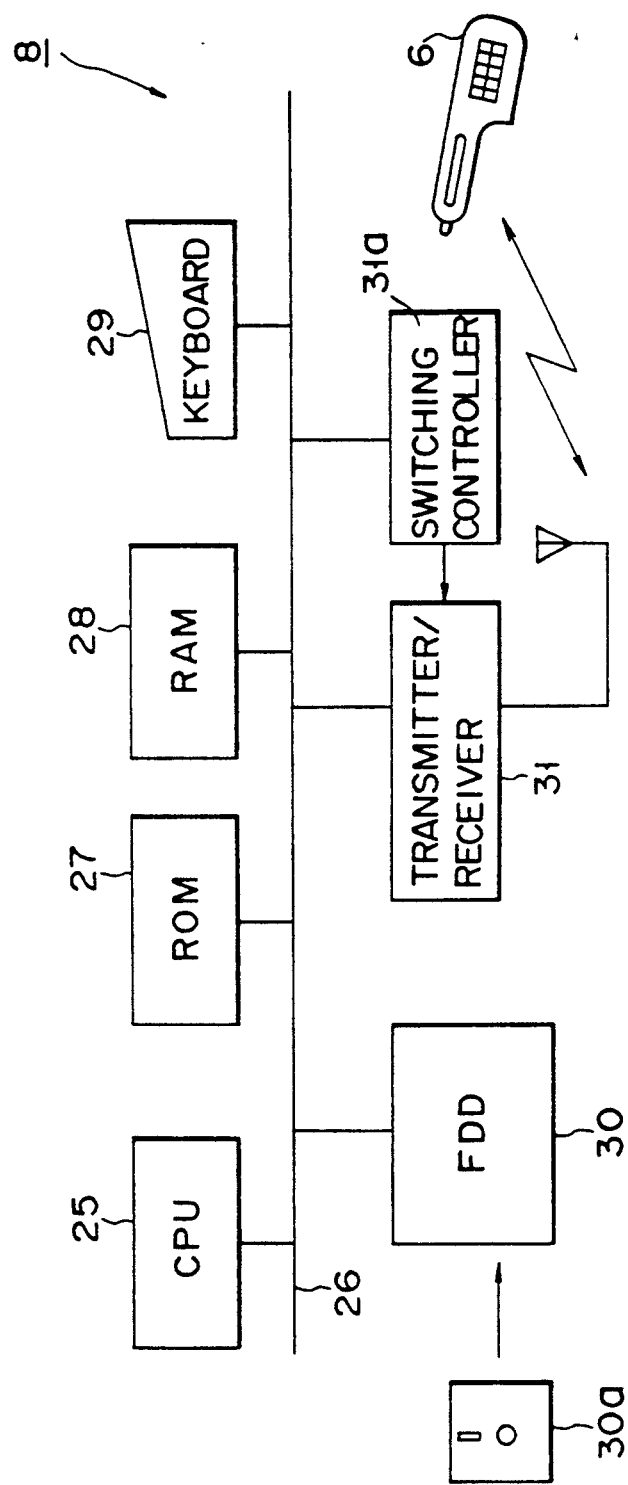
FIG. 6 is a block diagram illustrating the electric arrangement of a data recording controller for use in the meter reading system according to this embodiment.

FIG. 6 is a block diagram showing the schematic structure of the data recording controller 8 installed in the automobile 7. A CPU 25 for executing various information processes is connected via a bus line 26 with a ROM 27 for storing a program, a RAM 28 for storing various variable data such as a previous reading to be sent to the data input terminal unit 6 and meter reading data sent from the unit 6, a keyboard 29 having an array of various operation keys, a FDD (floppy disk drive) 30 for driving a floppy disk 30a as an external storage device for storing a meter reading data file or the like, a transmitter/receiver 31 for exchanging various data with the data input terminal unit 6, and a switching controller 31a for switching between a reception mode and a transmission mode of the transmitter/receiver 31.

As shown in FIG. 7, in the floppy disk 30a loaded into the FDD 30 is stored a meter reading data file 30b which stores the previous reading $D_0$, present reading $D_1$, present amount used $D_2$, the type of contract (not shown) and present charged rate S for the meter 2 for the user number AD of each of the users whose houses the meterman 5 should go around in a day or a week. Before reading a meter, only the previous reading $D_0$ is stored. When reading a meter for one user's house 1 is completed, the present reading $D_1$ and present amount used $D_2$ are written.

Figure 8A:
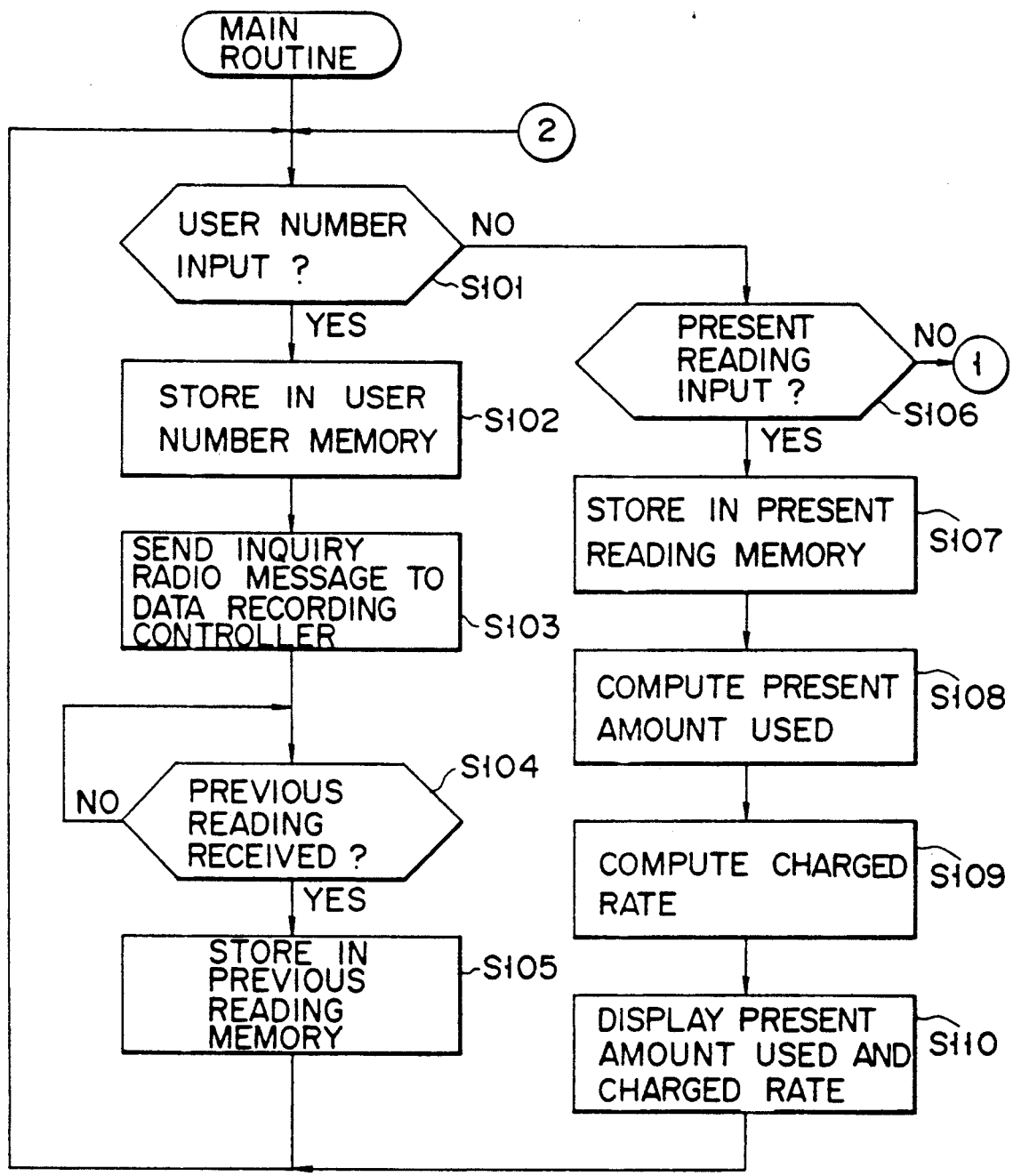
FIGS. 8A and 8B are flowcharts for explaining the operation of the data input terminal unit in FIG. 2.
Figure 8B:
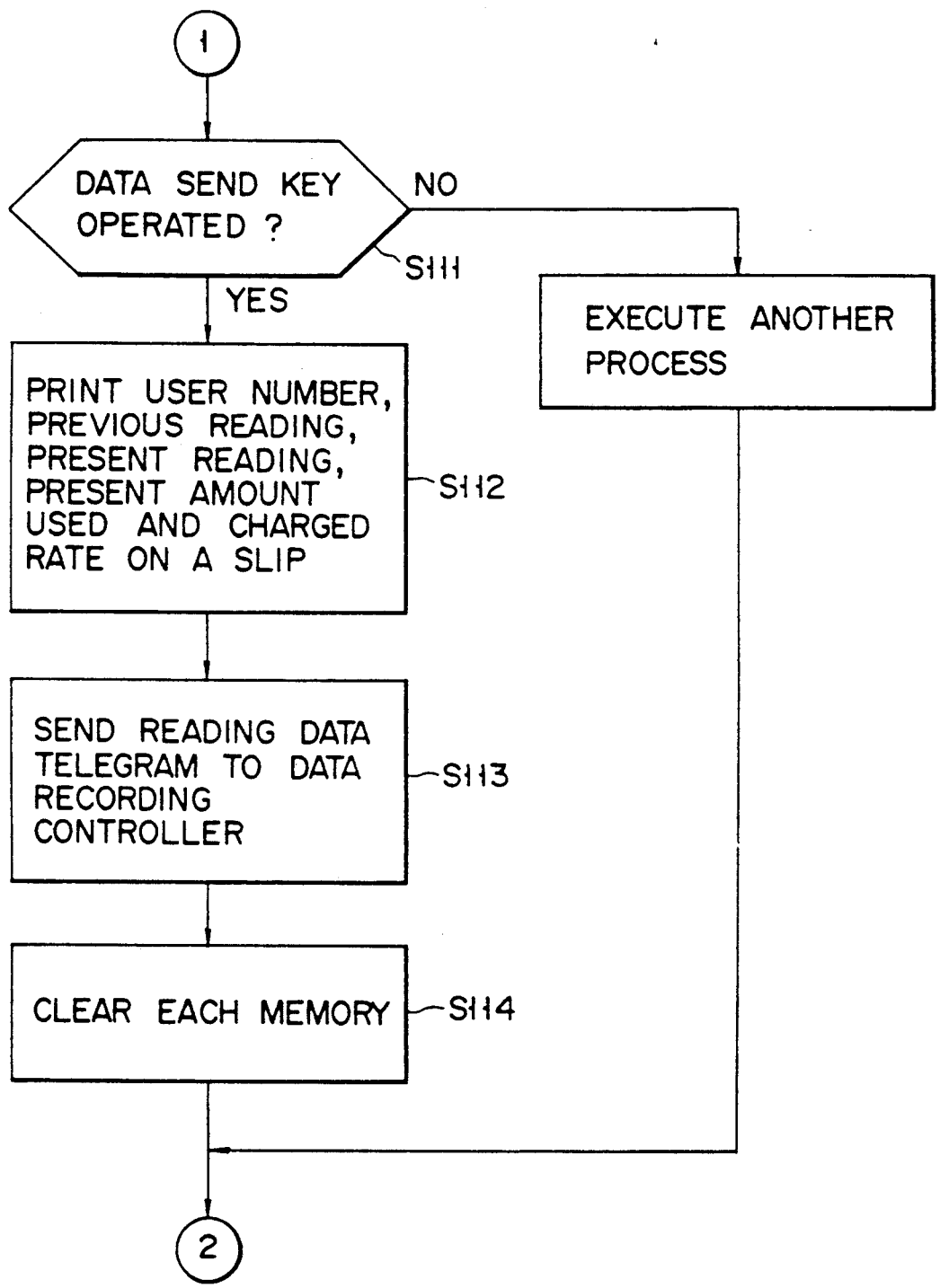

The CPU 17 of the data input terminal unit 6 is programmed to execute a meter reading work in accordance with the flowcharts shown in FIGS. 8A and 8B. The CPU 25 of the data recording controller 8 is programmed to execute a meter reading work in accordance with the flowchart shown in FIG. 9.

When a user number AD is input from the bar code reader 11 (step S101), the input user number AD is stored in the user number memory 20b of the RAM 20 (step S102). It is also displayed on the display 13. Then, this user number AD is added to an inquiry radio message for the previous reading $D_0$ and is sent through the transmitter/receiver 23 to the data recording controller 8 (step S103).

On the side of the data recording controller 8, upon reception of any radio message from the data input terminal unit 6 (step S201), it is discriminated whether the received radio message is an inquiry radio message or a meter reading data radio message (step S202). When an inquiry radio message is received, the CPU 25 of the data recording controller 8 retrieves the meter reading data file 30b (see FIG. 7) formed in the floppy disk 30a of the FDD 30, with the user number AD included in the radio message, to read the previous reading $D_0$ associated with the user number AD (step S203). The read previous reading $D_0$ is added to a response radio message and is sent through the transmitter/receiver 31 to the data input terminal unit 6 (step S204).

Upon reception of the previous reading $D_0$ from the data recording controller 8 (step S104), the data input terminal unit 6 stores it into the previous reading memory 20d (step S105). Then, the flow returns the beginning of the flowchart to be ready for the next operation.

When the present reading $D_1$ read from the display section 4 of the meter 2 is input by a combined key operation of the ten-key 14a and set key 14b (step S106), this present reading $D_1$ is stored in the present reading memory 20c (step S107). The present amount used $D_2$ is computed from the formula $D_2 = D_1 - D_0$ based on the previous reading $D_0$ of the previous reading memory 20d and the present reading $D_1$ of the present reading memory 20c (step S108).

When the present amount used $D_2$ is obtained, the present charged rate S is computed using a formula stored in the rate calculating formula memory 20a (step S109). The computed charged rate S and the present amount used $D_2$ are displayed on the display 13 (step S110). Then, the flow returns to the beginning of the flowchart to be ready for the next operation.

Assuming that the data transmission key 14c of the keyboard 14 is operated (step S111), it is determined that the meterman 5 considers proper the present amount used $D_2$ and the charged rate S, both displayed on the display 13 as shown in FIG. 2, for example. Meter reading data including the user number AD, previous reading $D_0$, present reading $D_1$, present amount used $D_2$ and charged rate S, is printed by the printer 16 and is issued as the reading slip 15 (step S112).

Then, the meter reading data including the individual data AD, $D_1$, $D_2$ and S excluding the previous reading $D_0$ is incorporated into a meter reading data radio message and is sent through the transmitter/receiver 23 to the data recording controller 8 (step S113). As the above completes the meter reading work for one user number's house 1, the memories 20b to 20h of the RAM 20 excluding the rate formula memory 20a are cleared (step S114).

The data recording controller 8, which has received a meter reading data radio message from the data input terminal unit 6, retrieves the meter reading data file 30b formed in the floppy disk 30a of the FDD 30, with the user number AD included in the radio message (step S205), and stores the input present reading $D_1$, present amount used $D_2$ and charged rate S into the respective areas of the associated user number AD (step S206).

Individual meter reading data of each user's house 1 is sequentially stored in the meter reading data file 30b formed in the floppy disk 30a of the FDD 30 in the above manner. When a meter reading work for one day, for example, is completed, the floppy disk 30a is unloaded from the FDD 30 of the data recording controller 8, and is loaded in a FDD connected to the host computer located in the office to input in the host computer the meter reading data of each user's house 1 stored in the meter reading data file 30b of this floppy disk 30a.

Figure 10:
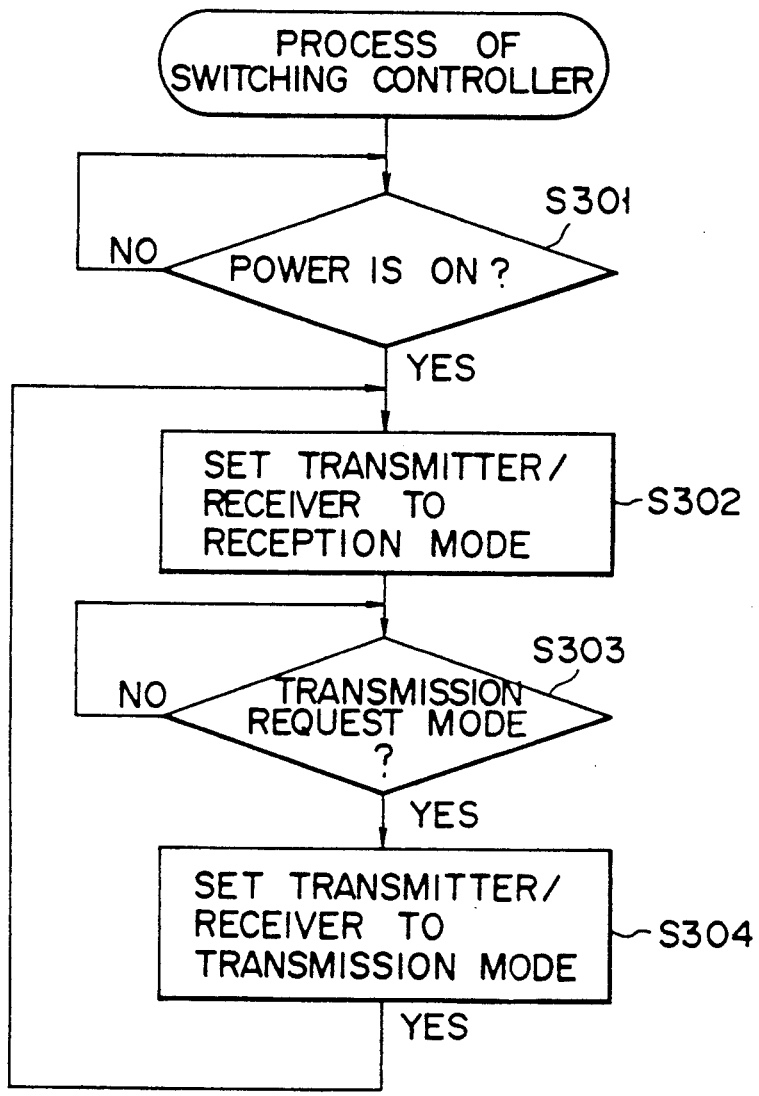
FIG. 10 is a flowchart of a switching control operation for a transmitter/receiver in the data input terminal unit shown in FIG. 2.

Switching between a transmission mode and a reception mode for the transmitter/receiver 23 of the data input terminal unit 6 o the transmitter/receiver 31 of the data recording controller 8 is executed through the control of the switching controller 23a or 31a according to the flowchart in FIG. 10 by the CPU 17 or 25. That is, when power of the apparatus is given (step S301), the mode of the transmitter/receiver 23 or 31 is switched to the reception mode through the switching controller 23a or 31a (step S302). When a transmission request is made, e.g., in the aforementioned step S103 or S204, the transmitter/receiver 23 or 31 is switched to the transmission mode through the switching controller 23a or 31a (step S304). Upon completion of transmission, the flow returns to the step S302 where the mode is immediately returned to the reception mode. The transmitter/receivers 23 and 31 are controlled in such a way that they normally keep the reception mode, and their modes are changed to he transmission mode only when a transmission request is made.

Between the data input terminal unit 6 and data recording controller 8, the meter reading data is converted into a digital value and is radio-transmitted after undergoing FKS modulation in a state it is incorporated in a meter reading data radio message 32 of a format as exemplified in FIG. 11A.

A header is provided at the head of the radio message 32, followed by a start-of-text (STX) code. Fourteen pieces of data, d1 to d14 comes after the STX code, followed by an end-of-text (EXT) code, upper parity data 33 and lower parity data 34. And a carriage return (CR) code and a line feed (LF) code are located at the last position.

According to this embodiment, data d1 and d2 indicate a user number AD, data d3 and d4 a present reading $D_1$, data d5 and d6 a present amount used $D_2$, and data d7 and d8 a charged rate S.

In the upper parity data 33 and lower parity data 34, as shown in FIGS. 11B and 11C, odd horizontal parity data [P1-P8] of individual data d1-d14 is divided into two parts, and individual data [P1-P4] and [P5-P8] of divided four bits are assigned to lower four bits, respectively. Preset specific codes [S1-S8] are separately assigned to the upper four bits. With the odd horizontal parity data [P1-P8] being divided into two parts to be assigned to the upper and lower parity data, if the specific code of the upper four bits is set to a code which never coincides with the CR code, each 8-bit parity data can be prevented to have the same value as the CR code of the next 8 bits. It is therefore possible to surely detect when an error occurs in individual data d1-d14 during transmission. When such an error is detected, individual data d1-d14 can be sent again, thus improving the reliability of the transmitted data d1-d14. Since a data transmission system which performs a parity check of each data in the above-described manner is already disclosed the Published Unexamined Japanese Patent Application No. 63-257836 and is thus well known, its detailed description will be omitted here.

According to the present meter reading system with the above structure, a label with a user number has only to be attached to a meter placed at each user's house, and no modification of the meter is required. Employing the present meter reading system would not significantly increase the cost of the equipment.

Further, since the user number can be easily read without mistaken by the bar code reader, a meterman needs to simply read a reading visually and to enter it using keys. As compared with the case where the user number and reading are both input manually, the operability can be considerably improved. In addition, a reading slip is automatically issued, which can greatly reduces the load.

Furthermore, meter reading data is radio-transmitted to the data recording controller and is automatically registered in the meter reading data memory constituted by a floppy disk. Unloading this floppy disk, then loading it into the FDD of the host computer can automatically input the meter reading data into the host computer. Therefore, the meterman needs to perform only one input operation of a reading. This can significantly reduce the probability of the wrong reading into the host computer. Accordingly, the work efficiency of the overall meter reading work as well as the reliability of the meter reading work can be improved.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

What is claimed is:

1. A meter reading system comprising:
    a data recording controller mounted on a vehicle, said vehicle being in general proximity to a meter to be read, said controller including a meter reading data file having a data storage area formed for storing a previous reading for each user number and capable of storing at least a present reading and charged rate, said data recording controller further including an RF transceiver for receiving and transmitting data;
    a meter placed at a house of each user and having a display section for displaying a present reading and having a bar-coded user number attached onto a front surface of said meter; and
    a data input terminal unit for radio-transmitting and receiving data directly to and from said data recording controller, said data input terminal unit comprising,
    a casing having an end portion, the size of which is such that the end portion can be held by one hand,
    a pen-scanner type bar code reader, attached to one end of said casing in the longitudinal direction, for reading said bar-coded user number attached on said meter,
    a keyboard, attached near the other end of said casing in the longitudinal direction, for manually entering a present reading according to a reading displayed on said display section of said meter,
    a transmitting/receiving means, included within said casing, for transmitting wirelessly to said data recording controller said user number read by said bar code reader and for receiving wirelessly a previous reading associated with said user number from said data recording controller,
    used-amount computing means, included within said casing, for computing the amount used from said previous reading as obtained from said data recording controller in response to said user number and said present reading entered through said keyboard,
    printer means, attached to the other end of said casing in the longitudinal direction, responsive to said computing means for printing on a reading slip, meter reading data including at least said previous reading and said computed amount used, and
    means, included within said casing and responsive to said keyboard for causing the wireless transmission of said meter reading data to said data recording controller by said transmitting/receiving means.

2. A meter reading system according to claim 1, wherein said data recording controller includes means for retrieving said meter reading data file to read said previous reading and transmitting said previous reading to said data input terminal unit in accordance with an inquiry from said data input terminal unit.

3. A meter reading system according to claim 1, wherein said data recording controller includes means for storing at least a present reading into said meter reading data file based on said meter reading data sent from said meter reading data transmitting means of said data input terminal unit.

4. A meter reading system according to claim 1, wherein said data input terminal unit further includes rate computing means for computing a charged rate based on a used amount computed by said used-amount computing means.

5. A meter reading system according to claim 4, wherein said reading slip printer means of said data input terminal unit includes means for permitting said printer to also print on said reading slip said charged rate computed by said rate computing means.

6. A meter reading system according to claim 5, wherein said meter reading data wireless transmitting means of said data input terminal unit includes means for also transmitting rate data representing charged rate computed by said rate computing means, to said data recording controller.

7. A meter reading system according to claim 6, wherein said data recording controller includes means for storing at least a present reading and a charged rate into said meter reading data file based on said meter reading data and said rate data, sent from said meter reading data wireless transmitting means of said data input terminal unit.

* * * * *